July 28, 1959 M. J. LIESER 2,896,665
NORMALLY CLOSED THREE-WAY VALVE
Filed Aug. 25, 1955
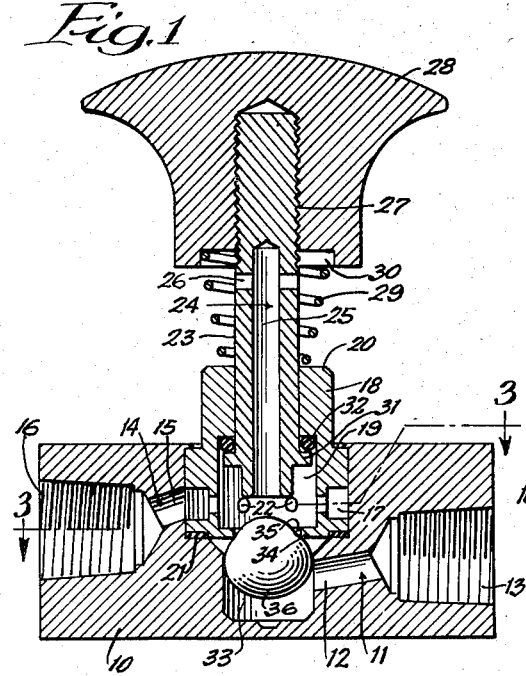
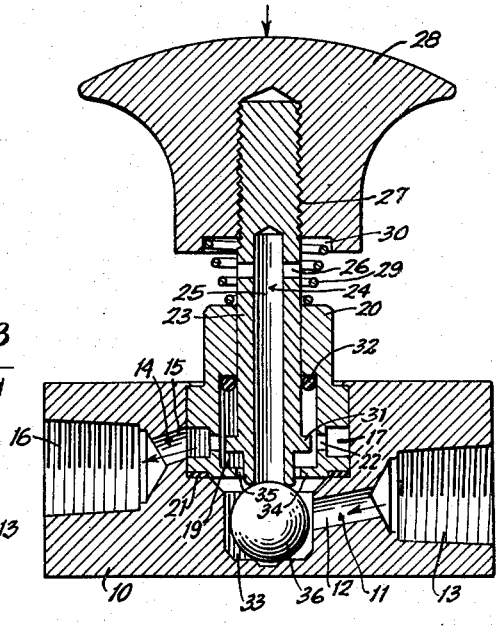
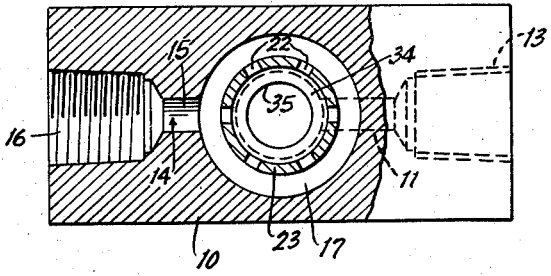
INVENTOR:
Mathias J. Lieser,
BY
Dawson, Tilton & Graham,
ATTORNEYS.

United States Patent Office 2,896,665
Patented July 28, 1959

---

2,896,665

NORMALLY CLOSED THREE-WAY VALVE

Mathias J. Lieser, Chicago, Ill., assignor to Mead Specialties Company, Inc., Chicago, Ill., a corporation of Illinois Application August 25, 1955, Serial No. 530,497

6 Claims. (Cl. 137—620)

This invention relates to a valve structure, and more especially to a three-way valve that in released position is normally closed, thereby preventing the flow of pressure fluid between the inlet and outlet ports thereof.

It is an object of this invention to provide an improved three-way valve structure having numerous advantages not found in known prior art valves of this type. Another object of the invention is in providing a valve structure that functions to close or terminate the flow of fluid between the inlet and outlet ports of the valve, to exhaust the outlet port when the flow of pressure fluid thereto is terminated, and to permit the flow of pressure fluid between the inlet and outlet ports while sealingly closing the exhaust passages, the structure being advantageous from a parts and assembly standpoint, whereby cost savings are realized, but at the same time providing effective, efficient and reliable operation.

A further object of the invention is in providing a three-way valve structure employing a ball as the valve element, a single ball being operative to selectively seal off the pressure fluid inlet port or the exhaust passage of the valve. Yet a further object is in the provision of a three-way valve structure of the character described wherein the ball valve is both compressible and resilient, and at certain times in the operation of the valve is flattened by the fluid pressures exerted thereagainst to effectuate seals that interrupt the flow of pressure fluid through selected passages or ports of the valve. Additional objects and advantages will appear as the specification proceeds.

An embodiment of the invention is illustrated in the accompanying drawing, in which—

Figure 1 is a longitudinal sectional view of a three-way valve embodying the invention, and in which the valve is shown in its released position or closed position; Figure 2 is a longitudinal sectional view similar to that of Figure 1, but showing the valve in its open or "on" position; and Figure 3 is a longitudinal sectional view taken along the line 3—3 of Figure 1.

Three-way valves are known in the art, and that term is used to identify valves that function to permit the flow of pressure fluid between the inlet and outlet ports of the valve, to selectively interrupt that flow of pressure fluid, and thirdly, to exhaust the outlet port or passage when the flow of pressure fluid thereto is terminated. Such valve may be contrasted with simple on/off valves that do not provide these three functions. Such valves may be operated by hand, or may be associated with automatic control equipment that cyclically shifts the valve between open and closed positions. The valves are customarily arranged in a pressure fluid circuit to pressure fluid-operated machines of various types, such as drill presses, etc.

The valve structure has a casing or chest 10 that is provided with an inlet port designated generally with the numeral 11, and comprising an inlet passage 12 communicating at its outer end with a threaded enlarged portion 13, adapted to threadedly receive the fittings of a pressure fluid supply conduit. An outlet port 14 is also provided by the casing 10, and it comprises an outlet flow passage 15 that at its outer end is enlarged and threaded, as shown at 16, to accommodate the threaded fitting of a pressure fluid conduit. The passage 15 opens into an annular channel or recess 17 that is formed about an insert member 18 having a longitudinal passage or bore 19 extending therethrough. The insert member is elongated at its upper end to provide a boss portion 20.

The member 18 seats within an enlarged opening provided in the chest or casing 10, and may be secured in such position by means of a press fit or preferably by swaging, as shown. A sealing basket 21 may be interposed between wall portions of the casing and of the member 18, as is shown, to prevent the escape of pressure fluid from between those meeting surfaces. When mounted within the casing, the member 18 aligns the annular recess or channel 17 with the outlet passage 15, and a plurality of outlet openings 22 communicate openly with the inner bore 19 of the member 18 and with the annular channel 17, whereby the outlet port 14 communicates directly with the interior—or specifically, with the bore 19—of the member 18. Thus, fluid to be exhausted from outlet flow passage 15 first enters annular channel 17 and thereafter enters chamber 19 through the plurality of openings 22, thereby insuring maximum flow. Similarly, when the valve is in the operative position shown in Fig. 2, fluid from inlet flow passage 12 passes into chamber 19 and through openings 22 into annular channel 17 and thence to outlet flow passage 15.

Slidably mounted within the insert member 18 is a valve stem 23 provided with an exhaust port or passage 24 that comprises a longitudinally extending exhaust passage 25 communicating with the exterior through a transversely extending exhaust passage 26. At its upper end, the stem 23 is threaded, as shown at 27, and threadedly receives a button or knob 28. The knob 28 is adapted to be grasped in the hand to depress the stem 23, and it will be apparent that when the valve is not to be operated by hand, that the buttotn 28 may be replaced with a cam follower or some equivalent abutment member that will be engaged by the cams or levers of control equipment arranged to control the opening and closing of the valve.

A coil spring 29 surrounds the upper portion of the valve stem 23 and seats at one end within a recess 30 provided in the button 28, and at its other end against the upper surface 20 of the insert member 18. The coil spring biases the stem toward the position shown in Figure 1. The stem is prevented from being completely extended through the insert member 18 by means of an annular flange 31 with which it is equipped adjacent the lower or inner end thereof. The flange 31 is adapted to sealingly abut a gasket 32 that may be in the form of an O-ring, and that in turn abuts the lower surface of the nut 20. The O-ring serves to provide a fluid-tight seal between the nut 20 and valve stem 23 when the stem is in the position shown in Figure 1.

The casing 10 also provides a valve chamber 33 that is in open communication with the passage 12 of the inlet port 11. It is noted that the passage 12 is inclined downwardly, and is oriented so that pressure fluid discharging from the passage, flows downwardly toward the lower end portion of the valve chamber 33. The upper end of the chamber 33 is partially closed by a valve seat 34 in the form of an inwardly extending annular flange provided by the member 18. The seat 34 defines a valve port 35 therein.

Mounted within the valve chamber 33 is a valve 36 that is resilient and compressible, and is preferably in the form of a ball valve, as shown. The valve 36 may be made of rubber or some other appropriate material that is both resilient and compressible. I have found that a relatively hard rubber—that is, having sufficient hardness so that it will not become lodged in the position shown in Figure 1, and having a Durometer elasticity rating of from 40 to 45—provides satisfactory results. The ball valve 36 is dimensioned so that it can move longitudinally within the valve chamber 33, but when pressure fluid from the inlet port 11 creates a force thereacross, it flattens or compresses slightly along one dimension, and as a result extends along a plane generally at right angles thereto to sealingly engage the walls of the chamber 33.

In use of the valve structure, the inlet port 11 will be connected to a suitable pressure fluid supply conduit, and the outlet port 14 similarly will be connected to a fluid pressure conduit that carries the pressure fluid to equipment operated thereby and that is to be controlled by the valve. The pressure of the supply fluid may vary between rather wide limits, and the valve can be used successfully through a pressure range of about 15 to 125 pounds per square inch. If the valve is to be operated by hand, it will ordinarily have a stem equipped with a button or knob 28, as illustrated, while if the valve is to be arranged with automatic equipment, the stem may be provided with a device such as a cam follower that will be more appropriate for use with the actuating members of such control equipment.

Normally, the valve assumes the position shown in Figure 1 with the coil spring 29 biasing the stem outwardly or toward open position. The valve is normally in closed position because the pressure fluid flowing outwardly from the passage 12 of the inlet port is oriented downwardly and fills the lower end portion of the valve chamber 33. In exerting an upward force against the valve 36, it drives the valve upwardly and into engagement with the valve seat 34. Since the ball valve is slightly compressible, the pressure fluid causes the valve to flatten slightly whereby it expands transversely, filling the chamber 33 across sectionally and sealingly engaging the walls thereof. Thus, it is clear that pressure fluid from the inlet port 11 cannot pass the valve 36 and there will be no flow of fluid through the valve structure.

When the valve is in this position, the outlet port 14, and more particularly the flow passage 15 thereof, is in open communication with the bore or chamber 19 through the annular channel 17 and apertures 22. The exhaust port 24 is also in communication with the chamber 19, for the longitudinally extending passage 25 thereof opens into that chamber. Thus, the outlet port is exhausted to atmosphere through the longitudinal passage 25 and transverse passage 26, both forming the exhaust port.

When it is desired to shift the valve from its normally closed position to an open or "on" position, the knob 28 and stem 23 are depressed to shift the valve into the position illustrated in Figure 2. In moving the stem 23 downwardly, the ball valve 36 is shifted downwardly within the chamber 33 and into engagement with the bottom wall thereof. Thus, the valve port 35 is opened and pressure fluid may flow freely from the inlet port 11, into the chambers 33 and 19 and outwardly therefrom and into the outlet port 14. At the same time, the lower end portion of the stem 23 is in abutting engagement with the ball valve 36, thereby sealing off the exhaust port whereby none of the pressure fluid can escape to atmosphere.

The valve, by means of a single ball valve, is functional to provide communication between the inlet and outlet ports thereof, to interrupt such communication and to establish communication between the outlet port and exhaust port of the structure. Positive sealing conditions are provided by the resilient, compressible ball valve so that the flow patterns are easily and efficiently established. The elastic character of the ball and the compressibility thereof causes it to establish a seal with the walls of the valve chamber, and since the ball valve is dimensioned so that it is freely movable through the chamber in the absence of pressure fluid being applied thereto, it is free to rotate or turn, and as a result no excessive wear will occur at any single point or points along the valve. Further, the structure operates to always return the outlet port 14 and equipment connected thereto to atmospheric pressure upon termination of the supply of pressure fluid to the port 11.

The valve structure is one intended to be fabricated economically and to be replaced in toto rather than repaired. As a result, it is essential to provide a minimum number of parts. In the construction of the valve, the annular flange 34, that in the illustrations is oriented at right angles to the longitudinal axis of the stem 23, is initially disposed downwardly and extends along the longitudinal axis of the stem. Therefore, in assembling the structure the stem, before the button 28 is secured thereto, is moved upwardly through the insert member 18 to bring the annular flange 31 into the chamber 19. Thereafter, the insert member and stem are placed within a fixture, and the depending flange 34 is folded over and into the position shown in the figures of the drawing. Thereafter, the insert member is positioned within the enlarged opening provided for it in the valve casing or chest 10, and edge portions of the chest are swaged over as shown in Figures 1 and 2 to lock the insert member in position.

While in the foregoing specification an embodiment of the invention has been described in considerable detail for purposes of completely disclosing the invention, it will be apparent that those skilled in the art may make numerous changes in those details without departing from the spirit and principles of the invention.

I claim:

1. In a valve structure, a casing providing a valve chamber communicating with an inlet port and an outlet port and having a valve seat in the upper portion thereof, the inlet communicating with said valve chamber at a spaced distance below said valve seat and providing a sealing wall therebetween, a resilient ball valve freely mounted within said chamber and being dimensioned for longitudinal movement therein, said valve being adapted to engage said valve seat to seal the same and then to flatten into engagement with said sealing walls between the inlet passage and the valve seat, and a reciprocating stem adapted to extend through said valve seat and to move said resilient valve toward the bottom of said chamber to provide flow between said inlet and outlet ports, said stem being provided with a longitudinal exhaust passage open at the bottom end of the stem, said passage being closed by contact between said stem and said resilient ball valve.

2. In a valve structure having a horizontal casing provided centrally with a valve chamber and having inlet and outlet passages communicating therewith, said valve chamber having a valve seat in the upper portion thereof and sealing walls extending between said valve seat and the inlet passage, a vertically-extending valve stem guided for reciprocating movement and having a lower reduced portion adapted to extend through said valve seat, said stem having an exhaust passage extending longitudinally of the stem and having an open lower end adapted to be sealed by a resilient ball valve when said ball valve is pressed downwardly by said stem, a spring normally urging said valve stem upwardly and away from said seat, and a resilient ball valve freely mounted in said chamber and adapted to move upwardly under the pressure of the fluid from said inlet passage to seal said valve seat and to flatten into sealing engagement with said sealing walls between said valve seat and said inlet passage.

3. The structure of claim 2, in which the said inlet passage is inclined downwardly with its lower end adjacent the bottom of said chamber, whereby pressurized fluid entering said inlet passage necessarily urges said ball valve into engagement with said seat.

4. In a normally closed three-way valve, a casing provided with an internal flow chamber, an inlet port at the lower end of said chamber and exhaust port means at the upper end of said chamber, a valve seat in said chamber intermediate the ends thereof, an outlet port in said chamber above said valve seat, a resilient ball valve freely mounted in said chamber below said valve seat and adapted to be compressed thereagainst by pressurized fluid entering said chamber through said inlet port, said exhaust port means comprising a stem member slidably mounted in said casing and having a longitudinal passage therein open at the bottom end of said stem member and also communicating with the exterior of said casing, said stem member being shiftable into different positions within said chamber and shiftable through the opening in said valve seat to dislodge said ball valve therefrom against the pressure of said fluid and in cooperation with the bottom of said chamber to compress said ball valve so as to seal the open bottom of said stem member.

5. The structure of claim 4, in which said chamber is closed at the top thereof by an insert member, said insert member having a passage therethrough in which said stem member is slidably received, the lower end of said insert member having an inwardly-directed annular shoulder providing said valve seat.

6. The structure of claim 5, in which said insert member is equipped with an annular recess in the outer wall thereof, said recess communicating with said outlet passage, and, at, spaced-apart points, with said chamber.

References Cited in the file of this patent

UNITED STATES PATENTS

| | | |
|---|---|---|
| 1,279,087 | Desmond | Sept. 17, 1918 |
| 1,890,494 | Borden | Dec. 13, 1932 |
| 1,912,447 | Gray | June 6, 1933 |
| 2,534,509 | Franck | Dec. 19, 1950 |
| 2,545,000 | Martin | Mar. 13, 1951 |
| 2,634,781 | Turek | Apr. 14, 1953 |
| 2,664,266 | Johnson | Dec. 29, 1953 |
| 2,811,170 | Schmidt | Oct. 29, 1957 |